United States Patent
Kohn et al.

(10) Patent No.: US 9,719,435 B2
(45) Date of Patent: Aug. 1, 2017

(54) SYSTEMS AND METHODS FOR REAL-TIME ANGLE-DOMAIN MEASUREMENT OF FILTERED CYLINDER PRESSURE

(71) Applicants: Jacob Andrew Kohn, West Bloomfield, MI (US); Dung Kieu Lam, Royal Oak, MI (US)

(72) Inventors: Jacob Andrew Kohn, West Bloomfield, MI (US); Dung Kieu Lam, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 186 days.

(21) Appl. No.: 14/708,664

(22) Filed: May 11, 2015

(65) Prior Publication Data
US 2016/0333805 A1   Nov. 17, 2016

(51) Int. Cl.
| | |
|---|---|
| *F02D 35/02* | (2006.01) |
| *F02D 41/00* | (2006.01) |
| *G01M 15/06* | (2006.01) |
| *G01M 15/08* | (2006.01) |
| *F02D 41/14* | (2006.01) |

(Continued)

(52) U.S. Cl.
CPC ......... *F02D 35/023* (2013.01); *F02D 41/009* (2013.01); *F02D 41/1401* (2013.01); *F02D 41/26* (2013.01); *G01M 15/06* (2013.01); *G01M 15/08* (2013.01); *F02D 2041/1432* (2013.01); *F02D 2041/286* (2013.01)

(58) Field of Classification Search
CPC .. F02D 35/023; F02D 41/009; F02D 41/1401; F02D 41/26; F02D 2041/1432; F02D 2041/286; G01M 15/06; G01M 15/08
USPC .......................................... 701/102; 123/435
See application file for complete search history.

(56) References Cited

U.S. PATENT DOCUMENTS

| | | | |
|---|---|---|---|
| 7,606,655 B2 | 10/2009 | Husted et al. | |
| 7,913,545 B2 | 3/2011 | Verner et al. | |

(Continued)

FOREIGN PATENT DOCUMENTS

| | | |
|---|---|---|
| DE | 102010062444 A1 | 6/2012 |
| EP | 1736656 | 12/2006 |
| FR | 2993358 A1 | 1/2014 |

OTHER PUBLICATIONS

International Search Report and Written Opinion dated Aug. 3, 2016 for International Application No. PCT/US2016/031401, International Filing Date May 9, 2015.

*Primary Examiner* — Mahmoud Gimie
(74) *Attorney, Agent, or Firm* — Ralph E. Smith

(57) ABSTRACT

Techniques for measuring cylinder pressure include receiving an analog cylinder pressure signal indicative of pressure in a cylinder of an engine and an angular position signal indicative of an angular position of the engine. The analog cylinder pressure signal is converted to a digital cylinder pressure signal by (i) windowing the analog cylinder pressure signal in the angle-domain using the angular position signal and (ii) sampling the windowed analog cylinder pressure signal in the time-domain, and the digital cylinder pressure signal is filtered in the time-domain to obtain a filtered digital cylinder pressure signal. A measured pressure in the angle domain is obtained by sampling the filtered digital cylinder pressure signal using the angular position signal, and operation of the engine is controlled using the measured cylinder pressure.

18 Claims, 3 Drawing Sheets

(51) Int. Cl.
  *F02D 41/26* (2006.01)
  *F02D 41/28* (2006.01)

(56) References Cited

U.S. PATENT DOCUMENTS

2008/0221774 A1* 9/2008 Dagci .................... F02B 11/00
                                                                   701/102
2009/0038385 A1   2/2009 Catanese et al.

* cited by examiner

SYSTEMS AND METHODS FOR REAL-TIME ANGLE-DOMAIN MEASUREMENT OF FILTERED CYLINDER PRESSURE

FIELD

The present application relates generally to engines and, more particularly, to systems and methods for real-time angle-domain measurement of filtered cylinder pressure.

BACKGROUND

An engine combusts an air/fuel mixture within cylinders to drive pistons and generate drive torque. A cylinder pressure measurement system includes a plurality of analog cylinder pressure sensors configured to measure pressure within the cylinders. The measured cylinder pressures are used to control operation of the engine (e.g., spark timing). The cylinder pressure measurement system typically processes the analog cylinder pressure signals in the time-domain. These time-domain processed cylinder pressure signals, however, are not directly correlated to engine operation.

This lack of a correlation between the time-domain processed cylinder pressure signals and the engine's operation may cause inaccurate cylinder pressure measurements, which could result in inaccurate engine control. Moreover, processing the analog cylinder pressure signals in the time-domain requires substantial processing power and memory, which increases costs and/or implementation difficulty. Thus, while such cylinder pressure measurement systems work for their intended purpose, there remains a need for improvement in the relevant art.

SUMMARY

In accordance with an aspect of the invention, a cylinder pressure measurement system is provided. In one exemplary implementation, the system includes a first analog cylinder pressure sensor configured to generate a first analog cylinder pressure signal indicative of pressure in a first cylinder of an engine; an engine position sensor configured to generate an angular position signal indicative of an angular position of the engine; and a controller configured to: receive the first analog cylinder pressure signal and the angular position signal; convert the first analog cylinder pressure signal to a first digital cylinder pressure signal by (i) windowing the first analog cylinder pressure signal in the angle-domain using the angular position signal and (ii) sampling the windowed first analog cylinder pressure signal in the time-domain; filter the digital cylinder pressure signal in the time-domain to obtain a first filtered digital cylinder pressure signal; obtain a measured pressure in the first cylinder of the engine in the angle domain by sampling the first filtered digital cylinder pressure signal using the angular position signal; and control operation of the engine using the measured cylinder pressure in the first cylinder of the engine.

In accordance with an aspect of the invention, a method for measuring pressure in a cylinder of an engine is provided. In one exemplary implementation, the method includes receiving, at the controller, a first analog cylinder pressure signal indicative of pressure in a first cylinder of the engine; converting, by the controller, the first analog cylinder pressure signal to a first digital cylinder pressure signal by (i) windowing the first analog cylinder pressure signal using the angular position signal and (ii) sampling the windowed first analog cylinder pressure signal in the time-domain; filtering, by the controller, the first digital cylinder pressure signal in the time-domain to obtain a first filtered digital cylinder pressure signal; obtaining, by the controller, a measured pressure in the first cylinder of the engine in the angle-domain by sampling the first filtered digital cylinder pressure signal using the angular position signal; and controlling, by the controller, operation of the engine using the measured cylinder pressure in the first cylinder of the engine.

In some implementations, the controller is further configured to: detect a first trigger condition when a value of the angular position signal equals one of a first set of values; and in response to detecting the first trigger condition, perform analog-to-digital conversion of the first analog cylinder pressure signal to obtain the first digital cylinder pressure signal. In some implementations, the controller is further configured to: detect a second trigger condition when the value of the angular position signal equals one of a second set of values; and in response to detecting the second trigger condition, sample a value of the first filtered digital cylinder pressure signal to obtain the measured cylinder pressure in the first cylinder of the engine in the angle-domain.

In some implementations, a second analog cylinder pressure sensor is configured to generate a second analog cylinder pressure signal indicative of pressure in a second cylinder of the engine, and the controller is further configured to: receive the second analog cylinder pressure signal; convert the second analog cylinder pressure signal to a second digital cylinder pressure signal by (i) windowing the second analog cylinder pressure signal in the angle-domain using the angular position signal and (ii) sampling the windowed second analog cylinder pressure signal in the time-domain; filter the second digital cylinder pressure signal in the time-domain to obtain a second filtered digital cylinder pressure signal; obtain a measured pressure in the second cylinder of the engine in the angle-domain by sampling the second filtered digital cylinder pressure signal using the angular position signal; and control operation of the engine using the measured cylinder pressure in the second cylinder of the engine.

In some implementations, the controller is further configured to: detect a third trigger condition when a value of the angular position signal equals one of a third set of values that are different than the first set of values; and in response to detecting the third trigger condition, perform analog-to-digital conversion of the second analog cylinder pressure signal to obtain the second digital cylinder pressure signal. In some implementations, the controller is further configured to: detect a fourth trigger condition when the value of the angular position signal equals one of a fourth set of values that are different than the second set of values; and in response to detecting the fourth trigger condition, sample a value of the second filtered digital cylinder pressure signal to obtain the measured cylinder pressure in the second cylinder of the engine in the angle-domain.

In some implementations, the first and second sets of values of the angular position signal correspond to a combustion event in the first cylinder and a pumping event in the second cylinder. In some implementations, the third and fourth sets of values of the angular position signal correspond to a combustion event in the second cylinder and a pumping event in the first cylinder. In some implementations, the controller is configured to utilize a single analog-to-digital converter, a single digital filter, and a single triggered copier to obtain the measured cylinder pressures for both the first and second cylinders during a single cycle of the engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there remains a need for cylinder pressure measurement systems that are correlated to the engine's operation. More particularly, time-domain processed cylinder pressure signals require substantial processing power and memory, which increases costs and/or implementation difficulty. Accordingly, systems and methods are presented for real-time angle-domain measurement of filtered cylinder pressure. The systems and methods convert analog cylinder pressure signals in the time-domain to digital cylinder pressure signals in the engine angle-domain. Digital filtering is then performed in the time-domain, and the filtered digital cylinder pressure signal is sampled in the angle-domain to obtain measured cylinder pressure.

These systems and methods are capable of obtaining angle-corrected, time-filtered, digitized data for cylinder pressure, while decreasing processing and memory requirements. The systems and methods achieve the accuracy benefits of time-domain filtering without having to reprogram filters to operate in the angle domain. These decreased processing and memory requirements facilitate decreased costs and/or implementation complexity. More particularly, signal processing components (analog-to-digital converters (ADCs), digital filters, triggered copiers, measurement buffers, etc.) are also able to be reused for signals/cylinders whose angular regions of measurement do not overlap (e.g., combustion versus pumping).

While the systems and methods herein are described with respect to processing of analog cylinder pressure signals, it will be appreciated that these techniques could be similarly applied to other similar analog engine signals that relate to engine position. Examples of these other signals include, but are not limited to, analog signals output by (i) a manifold absolute pressure (MAP) sensor, (ii) an oxygen (O2) sensor (e.g., an exhaust gas O2 sensor), and (iii) a fuel rail pressure sensor. These techniques could also be similarly applied to other similar analog signals that relate to rotational position, such as signals relating to rotational position for electric motors or servos. Further, while two analog cylinder pressure sensors are discussed, these techniques could be extended to any even number of analog cylinder pressure sensors by duplicating the ADC, the digital filter, the triggered copier, and the measurement buffer, while sharing the engine position sensor, an angular position tracker, an engine speed tracker, a windowing comparator, a triggering comparator, and a clocking mechanism amongst all sets of duplicated elements.

Figure 1:
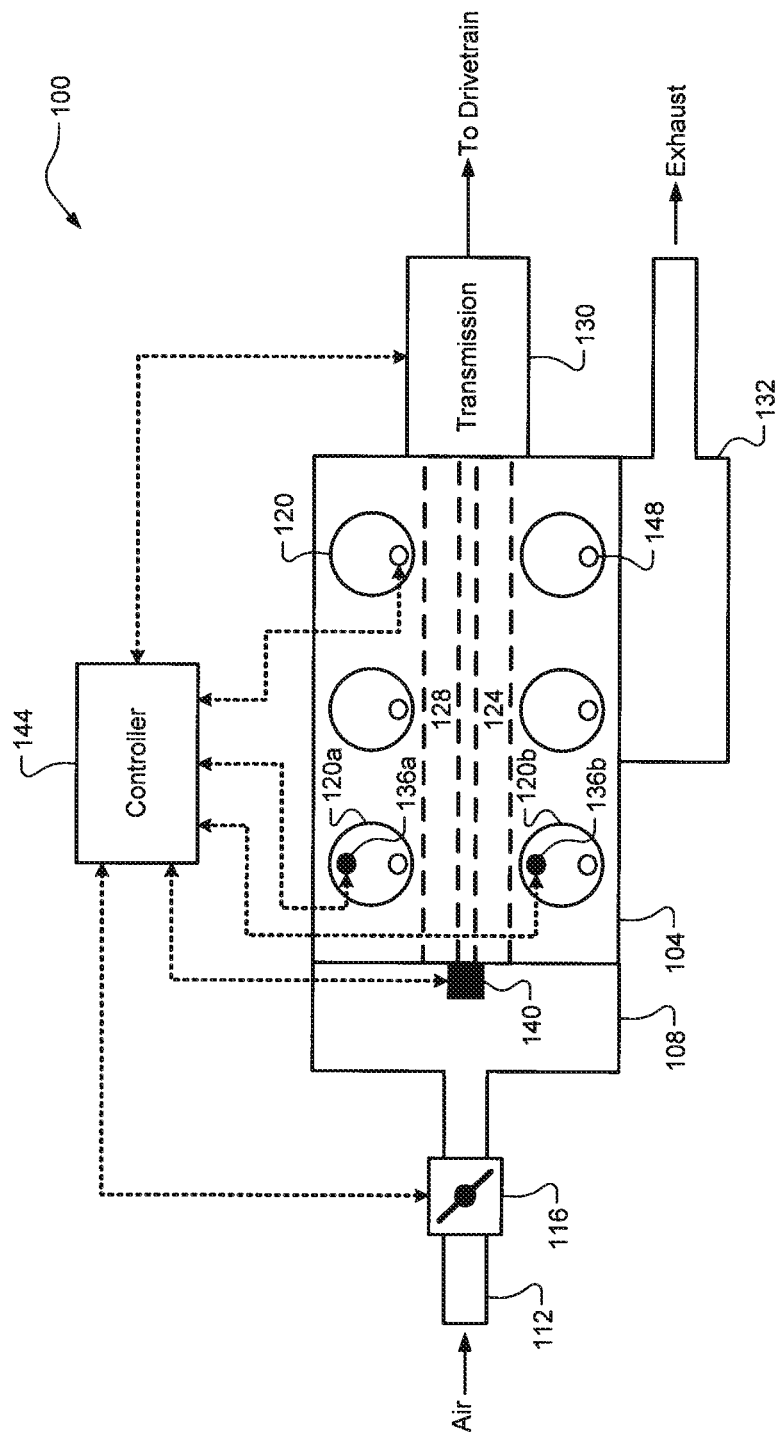
FIG. 1 is an example diagram of an engine system according to the principles of the present disclosure.

Referring now to FIG. 1, an example diagram of an engine system 100 is illustrated. The engine system 100 includes an engine 104 that draws air into an intake manifold 108 through an induction system 112 that is regulated by a throttle 116. The air in the intake manifold 108 is distributed to a plurality of cylinders 120 and combined with fuel to create an air/fuel mixture. The air/fuel mixture is compressed by pistons (not shown) within the cylinders 120 and combusted to drive the pistons and generate drive torque at a crankshaft 124. In some implementations, the engine 104 includes one or more camshafts 128 that control opening/closing of valves (not shown) of the cylinders 120. The drive torque at the crankshaft 124 is output to a transmission 130 (e.g., for transfer to a drivetrain of a vehicle). Exhaust gas resulting from combustion is expelled from the cylinders 120 into an exhaust system 132.

First and second analog cylinder pressure sensors 136a, 136b are configured to measure pressure in first and second cylinders 120a, 120b of the engine 104. While six cylinders and only two analog cylinder pressure sensors are shown for illustrative purposes, it will be appreciated that the engine 104 could have any number of analog cylinder pressure sensors (e.g., one per cylinder). In one exemplary implementation, the first and second cylinders 120a, 120b concurrently experience different events (e.g., one pumping, one combustion). An engine position sensor 140 is configured to measure an angular position of the engine 104. Examples of the engine position sensor 140 include, but are not limited to, a crankshaft position sensor and a camshaft position sensor. For example, the engine position sensor 140 could include a tooth wheel driven by the crankshaft 124 or one of the camshaft(s) 128.

A controller 144 is configured to control operation of the engine system 100. In one exemplary implementation, the controller 144 includes a communication device, such as a transceiver, one or more processors, and a memory (flash, hard disk, etc.). In one exemplary implementation, the communication device is configured to communicate with components of the engine system 100 (e.g., the analog cylinder pressure sensors 136 and the engine position sensor 140) via a controller area network (CAN) or local interconnect network (LIN). As discussed in greater detail below, at least a portion of an ADC and/or a digital filter could be implemented as part of the sensors 136. In such an implementation, the CAN or LIN could be responsible for transferring data in response to comparator triggers. In another exemplary implementation, the controller 144 is an application-specific integrated circuit (ASIC) or other electronically-controlled system configured to perform at least a portion of the techniques of the present disclosure.

The term "processor" as used herein refers to both (i) a single processor and (ii) a plurality of processors operating in a parallel or distributed architecture. Example functions performed by the controller 144 include controlling drive torque generated by the engine 104 in response to a torque request (e.g., from a driver) and controlling operation of the transmission 130. In one exemplary implementation, controlling the drive torque generated by the engine 104 includes controlling at least one of (i) airflow into/out of the engine 104 (e.g., the throttle 116), fuel supplied to the engine 104 (e.g., fuel injectors, not shown), and spark timing of spark plugs 148 of the engine 104. The controller 144 is also configured to perform the cylinder pressure measurement techniques of the present disclosure, which are now discussed in greater detail.

Figure 2:
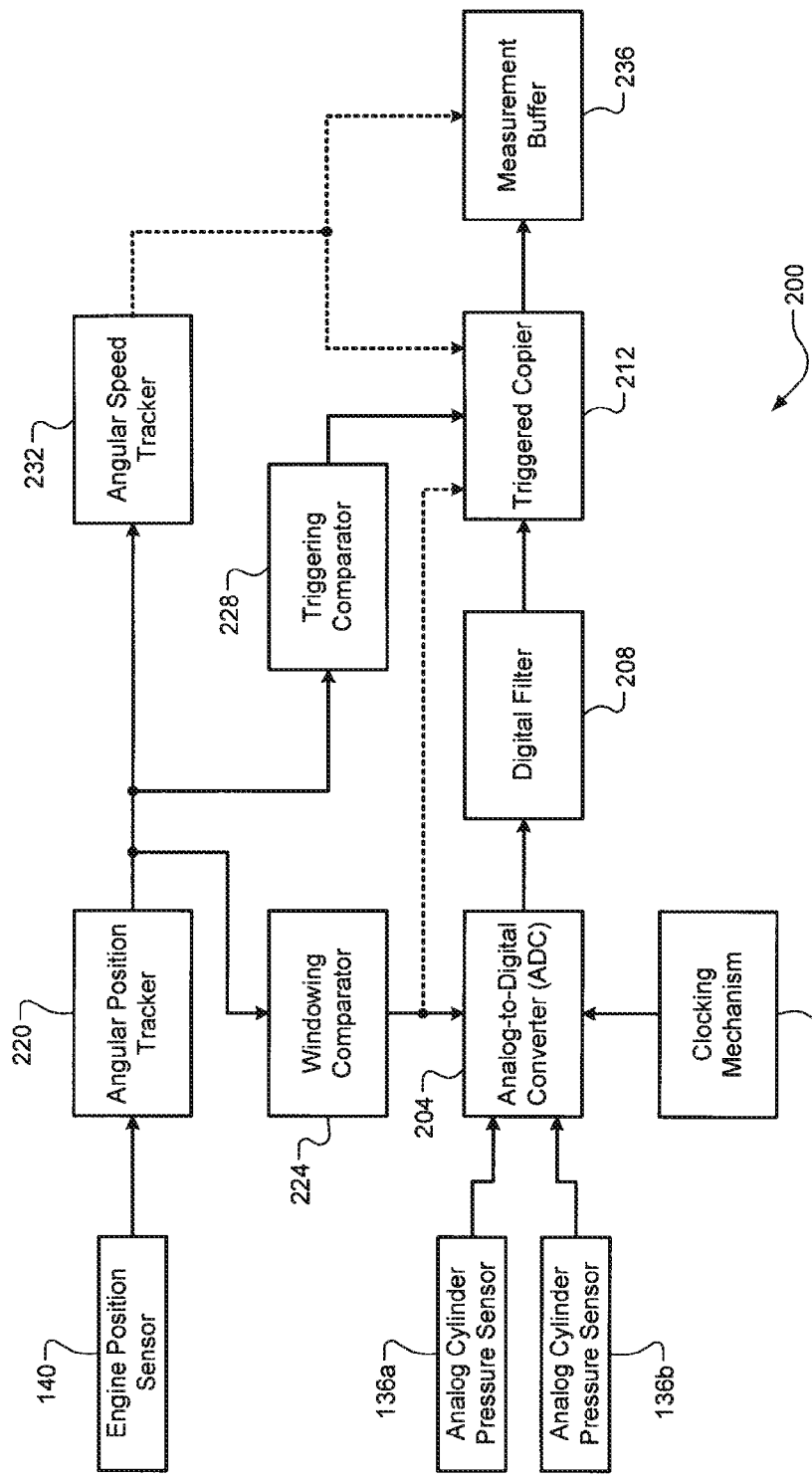
FIG. 2 is an example functional block diagram of a cylinder pressure measurement system architecture according to the principles of the present disclosure.

Referring now to FIG. 2, an example functional block diagram of cylinder pressure measurement system architecture 200 is illustrated. In one exemplary implementation, the architecture 200 is implemented by the controller 144. It will be appreciated, however, that at least a portion of the architecture 200 could be implemented at another controller, such as a standalone controller. The architecture 200 includes an ADC 204, a digital filter 208, and a triggered copier 212. The architecture 200 also includes a clocking mechanism 216, an angular position tracker 220, a windowing comparator 224, a triggering comparator 228, an angular speed tracker 232, and a measurement buffer 236. The windowing comparator 224 and the triggering comparator 228 may be described as generating first and second triggers, respectively, which are in the angle-domain.

The angular position tracker 220 receives and processes the angular position signal from the engine position sensor 140. The angular position tracker 220 processes the angular position signal to obtain a real-time angular position of the engine 104. In other words, this signal may track the engine's position in real-time. In one exemplary implementation, the angular position tracker 220 may be a coprocessor configured to (i) receive the signal generated by the engine position sensor 140 as input, (ii) interpolate the signal through a phase locked loop (PLL), and output an accurate approximation of the engine position in real-time (hereinafter, "engine position").

The engine position is provided to the windowing comparator 224, the triggering comparator 228, and the angular speed tracker 232. The windowing comparator 224 compares the engine position to a first set of positions. In one exemplary implementation, the first set of engine positions corresponds to engine positions of interest with respect to the first cylinder 120a. For example only, the first set of engine positions could correspond to a combustion event for the first cylinder 120a. When the engine position matches one of the first set of engine positions, the windowing comparator 224 generates a multiplexer advance trigger signal. In other words, the windowing comparator 224 is responsible for generating non-overlapping signal selection windows by generating outputs indicative of which input signals from the analog cylinder pressure sensors 136 to process over an angular range programmed into the windowing comparator 224 (e.g., the first set of positions), either through direct selection or by triggering a sequential multiplexer to advance through a circular list.

Rather, because the ADC 204 receives both the first and second analog cylinder pressure signals, the ADC 204 is actuated using this multiplexer advance trigger signal to transition from processing the first analog cylinder pressure signal to the second analog cylinder pressure signal, or vice-versa. This is capable because the angular regions of measurement for the first and second analog cylinder pressure signals (i.e., the first and second cylinders 120a, 120b) do not overlap. The ADC 204 also receives a clock signal from the clocking mechanism 216. The clock signal is used to control conversion (e.g., sampling) by the ADC 204 and thus the clocking mechanism 216 could also be described as generating a third trigger, which is in the time-domain. For example only, the clock signal may be 192 kilohertz (kHz). In one exemplary implementation, the clocking mechanism 216 is disabled or otherwise gated-off during engine positions that are not of interest, such as engine positions corresponding to deactivated cylinders.

The output of the ADC 204 is a digital cylinder pressure signal. The digital cylinder pressure signal is filtered by the digital filter 208 to obtain a filtered digital cylinder pressure signal. The digital filter 208 is configured to attenuate undesired time-frequency components from the digital cylinder pressure signal and is updated in real-time. In one exemplary implementation, the digital filter 208 is an infinite-impulse-response (IIR) filter or a finite-impulse-response (FIR) filter. While the digital filter 208 is described herein as being a hardware-based filter, thereby saving on memory, the digital filter 208 could also be implemented as a software-based filter.

As previously discussed, the triggering comparator 228 also receives the engine position. The triggering comparator 228 compares the engine position to a second set of positions. In one exemplary implementation, the second set of engine positions corresponds to engine positions of interest with respect to the first cylinder 120a. For example only, the second set of engine positions could correspond to the combustion event for the first cylinder 120a. The second set of engine positions could also be offset from the first set of positions due to being downstream from the windowing comparator 224. When the engine position matches one of the second set of engine positions, the triggering comparator 228 generates a down-sampled position trigger signal.

The filtered digital cylinder pressure signal is output to a triggered copier 212. The triggered copier 212 is a capturing mechanism that emits or outputs the filtered digital cylinder pressure signal at engine positions of interest for the corresponding cylinder (e.g., 120a or 120b). More particularly, the down-sampled position trigger signal generated by the triggering comparator 228 is used to actuate the triggered copier 212. The triggered copier 212 is also updated in real-time. Example mechanisms for this updating include, but are not limited to, (i) a programmable direct-memory-access (DMA) data transfer request and (ii) memory copy by interrupts triggered at the engine positions of interest (e.g., the down-sampled position trigger signal).

The triggered copier 212 is also configured to demultiplex multiple signals (e.g., first and second filtered digital cylinder pressure signals) into their respective signal buffers in the measurement buffer 236 (e.g., a memory). In one exemplary implementation, the triggered copier 212 demultiplexes the signals by changing the destination signal buffers in the measurement buffer 236 every time the multiplexer advance trigger signal is generated. In some exemplary implementations, the architecture 200 further includes a mechanism (not shown) that compensates for known time-domain latencies from the digital filter 208 and/or other sources in the path of the signals by converting these time-domain latencies to angular-domain latencies. The window generated by the windowing comparator 224 multiplexes the inputs into the ADC 204, and demultiplexes the output of the trigger copier 212. By coordinating this transition using the output of the windowing comparator 224 as the input for both the ADC 204 and the triggered copier 212, the signal coherency of each measurement buffer 236 is preserved (e.g., signal interleaving is minimized).

In one exemplary implementation, this latency measurement could be performed by either sampling the engine position output by the angular position tracker 220 at a completion of sampling the filtered digital cylinder pressure signal by the triggered copier 212, typically at the closing of the window specified by the windowing comparator 224. In another exemplary implementation, this latency measurement could be performed by tracking the angular speed (change in angular position with respect to time) generated by the angular speed tracker 232 ("engine speed") and multiplying the time-domain latency by the engine speed to produce the angle-domain latency. In yet another implementation, both of these latency measurements could be performed and their results summed, weight-averaged, or otherwise interpolated to obtain a final latency measurement.

The measurement buffer 236 could then be adjusted or otherwise compensate for the angle-domain latency measurement. In one exemplary implementation, the measurement buffer 236 could subtract the angle-domain latency measurement from the current engine position and then redirect any new samples from the triggered copier 212 to the current signal buffer in the measurement buffer 236 corresponding to the adjusted angle. In another exemplary implementation, the measurement buffer 236 could annotate its entries with the angle-domain latency measurement, which could be referenced when utilizing a corresponding measured cylinder pressure.

The final values stored in the measurement buffer 236 represent angle-corrected, time-filtered, digitized data collected at angles synchronous to the engine 104 over a desired angular range. As previously discussed, once the data is gathered over the angular range of interest for the first cylinder 120a, the multiplexer advance trigger signal could trigger the ADC 204 to convert the second analog cylinder pressure signal corresponding to the second cylinder 120b. For example only, the first cylinder 120a could experience a combustion event while the second cylinder 120b experiences a pumping event, and vice-versa, where the combustion event angular regions are the regions of interest. The windowing and triggering comparators 224 and 228, respectively, could use different sets of values (e.g., third and fourth sets of values, respectively) of the angular position signal for triggering purposes due to the non-overlapping cylinder angular operating range.

The controller 144 is configured to utilize the measured cylinder pressures from the measurement buffer 236 to control the engine 104. In one exemplary implementation, the controller 144 is configured to calculate an indicated mean effective pressure (IMEP) for each cylinder 120 and then adjust air charge consumption or combustion rates accordingly. More particularly, the controller 144 could feed the IMEP into a spark adjust model to obtain a modified spark timing for the engine 104 (e.g., spark advance or spark retardation). It will be appreciated, however, that the measured cylinder pressures could be used for any other control scheme of the engine 104 by the controller 144.

Figure 3:
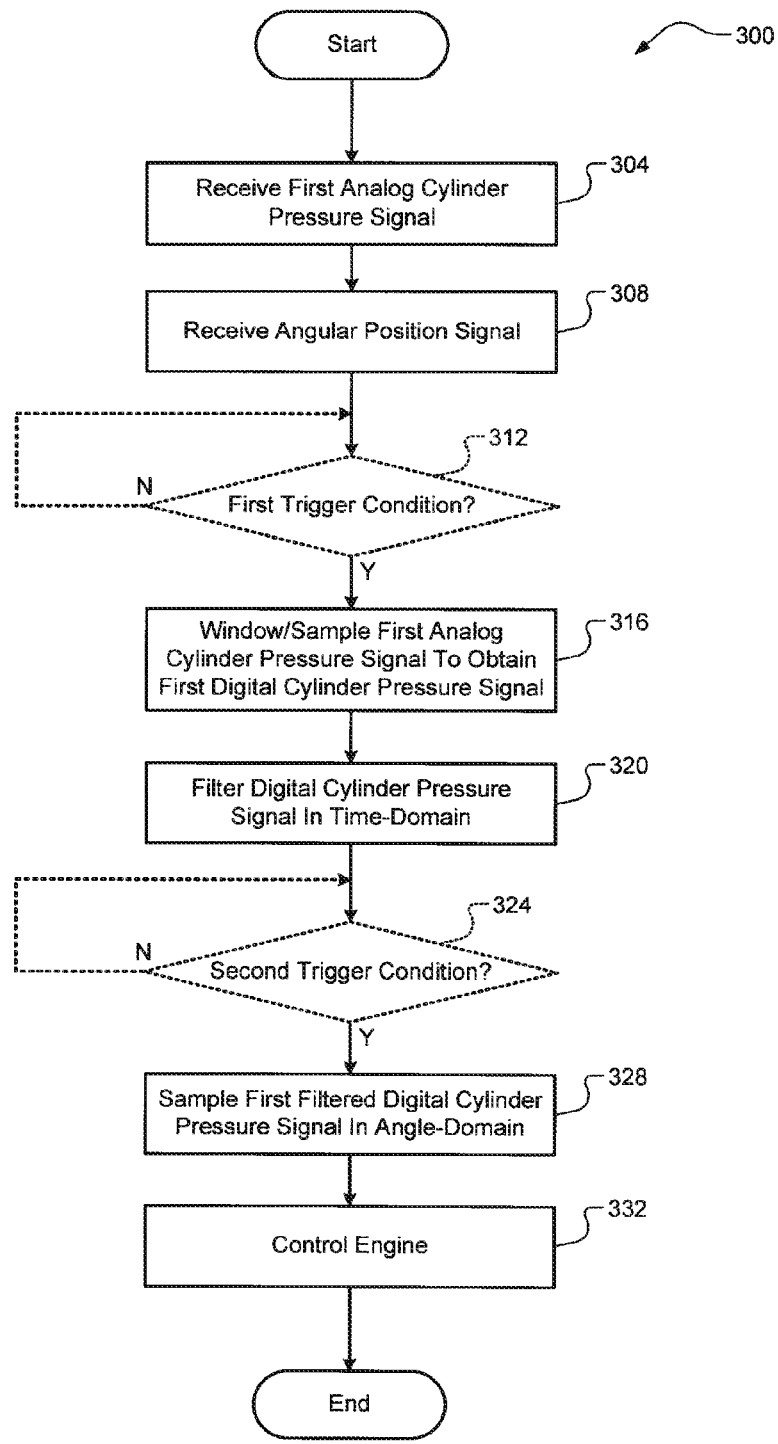
FIG. 3 is an example flow diagram of a method for measuring pressure in a cylinder of an engine according to the principles of the present disclosure.

Referring now to FIG. 3, an example flow diagram of a method 300 for measuring pressure in a cylinder of an engine is illustrated. At 304, the controller 144 receives the first analog cylinder pressure signal indicative of pressure in the first cylinder 120a of the engine 104. At 308, the controller 144 receives an angular position signal indicative of an angular position of the engine 104. In one exemplary implementation, the controller 144 detects the first trigger condition at 312 and, when detected, the method 300 proceeds to 316; otherwise, the method 300 returns to 312. At 316, the controller 144 converts the first analog cylinder pressure signal to a first digital cylinder pressure signal by (i) windowing the first analog cylinder pressure signal in the angle-domain using the angular position signal and (ii) sampling the windowed first analog cylinder pressure signal in the time-domain.

At 320, the controller 144 filters the digital cylinder pressure signal in the time-domain to obtain a first filtered digital cylinder pressure signal. In one exemplary implementation, the controller 144 detects the second trigger condition generated by the triggering comparator 228 at 324 and, when detected, the method 300 proceeds to 328; otherwise, the method 300 returns to 324. At 328, the controller 144 obtains a measured pressure in the first cylinder 120a in the angle domain by sampling the first filtered digital cylinder pressure signal using the angular position signal. At 332, the controller 144 controls operation of the engine 104 using the measured cylinder pressure in the first cylinder 120a. The method 300 then ends or returns to 304, such as to repeat for another cylinder of the engine 104 (e.g., cylinder 120b) during the same engine cycle and using the same signal processing components.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A cylinder pressure measurement system, comprising:
   a first analog cylinder pressure sensor configured to generate a first analog cylinder pressure signal indicative of pressure in a first cylinder of an engine;
   an engine position sensor configured to generate an angular position signal indicative of an angular position of the engine; and
   a controller configured to:
      receive the first analog cylinder pressure signal and the angular position signal;
      convert the first analog cylinder pressure signal to obtain a first digital cylinder pressure signal by (i) windowing the first analog cylinder pressure signal in the angle-domain using the angular position signal and (ii) sampling the windowed first analog cylinder pressure signal in the time-domain;
      filter the digital cylinder pressure signal in the time-domain to obtain a first filtered digital cylinder pressure signal;
      obtain a measured pressure in the first cylinder of the engine in the angle domain by sampling the first filtered digital cylinder pressure signal using the angular position signal; and
      control operation of the engine using the measured cylinder pressure in the first cylinder of the engine.

2. The system of claim 1, wherein the controller is further configured to:
   detect a first trigger condition when a value of the angular position signal equals one of a first set of values; and
   in response to detecting the first trigger condition, perform analog-to-digital conversion of the first analog cylinder pressure signal to obtain the first digital cylinder pressure signal.

3. The system of claim 2, wherein the controller is further configured to:
   detect a second trigger condition when the value of the angular position signal equals one of a second set of values; and
   in response to detecting the second trigger condition, sample a value of the first filtered digital cylinder pressure signal to obtain the measured cylinder pressure in the first cylinder of the engine in the angle-domain.

4. The system of claim 3, further comprising a second analog cylinder pressure sensor configured to generate a second analog cylinder pressure signal indicative of pressure in a second cylinder of the engine, wherein the controller is further configured to:
- receive the second analog cylinder pressure signal;
- convert the second analog cylinder pressure signal to a second digital cylinder pressure signal by (i) windowing the second analog cylinder pressure signal in the angle-domain using the angular position signal and (ii) sampling the windowed second analog cylinder pressure signal in the time-domain;
- filter the second digital cylinder pressure signal in the time-domain to obtain a second filtered digital cylinder pressure signal;
- obtain a measured pressure in the second cylinder of the engine in the angle-domain by sampling the second filtered digital cylinder pressure signal using the angular position signal; and
- control operation of the engine using the measured cylinder pressure in the second cylinder of the engine.

5. The system of claim 4, wherein the controller is further configured to:
- detect a third trigger condition when a value of the angular position signal equals one of a third set of values that are different than the first set of values; and
- in response to detecting the third trigger condition, perform analog-to-digital conversion of the second analog cylinder pressure signal to obtain the second digital cylinder pressure signal.

6. The system of claim 5, wherein the controller is further configured to:
- detect a fourth trigger condition when the value of the angular position signal equals one of a fourth set of values that are different than the second set of values; and
- in response to detecting the fourth trigger condition, sample a value of the second filtered digital cylinder pressure signal to obtain the measured cylinder pressure in the second cylinder of the engine in the angle-domain.

7. The system of claim 6, wherein the first and second sets of values of the angular position signal correspond to a combustion event in the first cylinder and a pumping event in the second cylinder.

8. The system of claim 6, wherein the third and fourth sets of values of the angular position signal correspond to a combustion event in the second cylinder and a pumping event in the first cylinder.

9. The system of claim 6, wherein the controller is configured to utilize a single analog-to-digital converter, a single digital filter, and a single triggered copier to obtain the measured cylinder pressures for both the first and second cylinders during a single cycle of the engine.

10. A method for measuring pressure in cylinders of an engine, the method comprising:
- receiving, at a controller of the engine, a first analog cylinder pressure signal indicative of pressure in a first cylinder of the engine;
- receiving, at the controller, an angular position signal indicative of an angular position of the engine;
- converting, by the controller, the first analog cylinder pressure signal to a first digital cylinder pressure signal by (i) windowing the first analog cylinder pressure signal in the angle-domain using the angular position signal and (ii) sampling the windowed first analog cylinder pressure signal in the time-domain;
- filtering, by the controller, the digital cylinder pressure signal in the time-domain to obtain a first filtered digital cylinder pressure signal;
- obtaining, by the controller, a measured pressure in the first cylinder of the engine in the angle domain by sampling the first filtered digital cylinder pressure signal using the angular position signal; and
- controlling, by the controller, operation of the engine using the measured cylinder pressure in the first cylinder of the engine.

11. The method of claim 10, further comprising:
- detecting, by the controller, a first trigger condition when a value of the angular position signal equals one of a first set of values; and
- in response to detecting the first trigger condition, performing, by the controller, analog-to-digital conversion of the first analog cylinder pressure signal to obtain the first digital cylinder pressure signal.

12. The method of claim 11, further comprising:
- detecting, by the controller, a second trigger condition when the value of the angular position signal equals one of a second set of values; and
- in response to detecting the second trigger condition, sampling, by the controller, a value of the first filtered digital cylinder pressure signal to obtain the measured cylinder pressure in the first cylinder of the engine in the angle-domain.

13. The method of claim 12, further comprising:
- receiving, at the controller, a second analog cylinder pressure signal indicative of pressure in a second cylinder of the engine;
- converting, by the controller, the second analog cylinder pressure signal to a second digital cylinder pressure signal by (i) windowing the second analog cylinder pressure signal in the angle-domain using the angular position signal and (ii) sampling the windowed second analog cylinder pressure signal in the time-domain;
- filtering, by the controller, the second digital cylinder pressure signal in the time-domain to obtain a second filtered digital cylinder pressure signal;
- obtaining, by the controller, a measured pressure in the second cylinder of the engine in the angle-domain by sampling the second filtered digital cylinder pressure signal using the angular position signal; and
- controlling, by the controller, operation of the engine using the measured cylinder pressure in the second cylinder of the engine.

14. The method of claim 13, further comprising:
- detecting, by the controller, a third trigger condition when a value of the angular position signal equals one of a third set of values that are different than the first set of values; and
- in response to detecting the third trigger condition, performing, by the controller, analog-to-digital conversion of the second analog cylinder pressure signal to obtain the second digital cylinder pressure signal.

15. The method of claim 14, further comprising:
- detecting, by the controller, a fourth trigger condition when the value of the angular position signal equals one of a fourth set of values that are different than the second set of values; and
- in response to detecting the fourth trigger condition, sampling, by the controller, a value of the second filtered digital cylinder pressure signal to obtain the measured cylinder pressure in the second cylinder of the engine in the angle-domain.

16. The method of claim 15, wherein the first and second sets of values of the angular position signal correspond to a combustion event in the first cylinder and a pumping event in the second cylinder.

17. The method of claim 15, wherein the third and fourth sets of values of the angular position signal correspond to a combustion event in the second cylinder and a pumping event in the first cylinder.

18. The method of claim 15, wherein the controller is configured to utilize a single analog-to-digital converter, a single digital filter, and a single triggered copier to obtain the measured cylinder pressures for both the first and second cylinders during a single cycle of the engine.

* * * * *